Patented Oct. 4, 1949

2,483,999

UNITED STATES PATENT OFFICE 2,483,999

N-(BETA-PYRROLIDINOETHYL)-PHENOTHIAZINE

James H. Hunter and William Bradley Reid, Jr., Kalamazoo, Mich., assignors to The Upjohn Company, Kalamazoo, Mich., a corporation of Michigan No Drawing. Application September 15, 1947, Serial No. 774,178

7 Claims. (Cl. 260—243)

1

The present invention relates to a new chemical compound, N-(beta-pyrrolidinoethyl)-phenothiazine, represented by the formula:

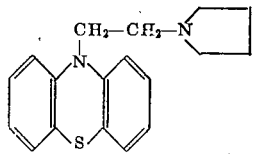

and to the acid and quaternary ammonium salts thereof. The compound may be obtained as the free base, which is a high-boiling liquid, soluble in organic solvents and slightly soluble in water, or as salts thereof, usually high-melting solids, many of which are soluble in water.

It is an object of the present invention to provide a novel compound, N-(beta-pyrrolidinoethyl)-phenothiazine, and salts thereof, which materials are useful therapeutically. Other objects of the invention will become apparent hereinafter.

The free base of the present invention forms stable salts with acids such as hydrochloric, sulfuric, acetic, oxalic, tartaric, citric, et cetera, as well as the methobromide, ethochloride, ethyl para-toluenesulfonate and other quaternary ammonium salts. The acid addition salts are prepared from the free base by reaction with the desired acid, while the quaternary ammonium salts are prepared by reaction of the free base with a selected alkyl halide or aryl or alkyl sulfonic ester, all as previously known in the art. The pharmacology of the compounds of this invention has been studied and the results obtained from use of the compounds as antihistaminics have been described in articles by Samuel M. Feinberg, Bengt Noren and Robert H. Feinberg, in Journal of Allergy, March 1948, vol. 19, pages 90 to 99, and Milton J. Vander Brook, Kenneth J. Olson, Marilyn T. Richmond and Marvin H. Kuizenga, in The Journal of Pharmacology and Experimental Therapeutics, October, 1948, vol. 94, No. 2, pages 197 to 208.

The new compounds may be obtained by reaction of a beta-pyrrolidinoethyl halide, e. g., the chloride, with phenothiazine in the presence of an alkaline condensing agent, e. g., sodium, potassium, sodium amide, a lithium amide, sodium hydride, potassium carbonate, et cetera. The hydrogen on the phenothiazine nucleus is replaced by the alkali metal, giving the alkali metal salt, which then reacts with the alkyl halide (prepared from the halide hydrohalide by known procedure), to yield the N-(beta-pyrrolidino-

2 ethyl)-phenothiazine. The free base may be separated as such, or converted to a desired salt as previously disclosed. In some instances, the beta-pyrrolidinoethyl halide hydrohalide may be advantageously employed directly in the process.

Beta-pyrrolidinoethyl halide hydrohalides may be prepared from beta-pyrrolidinoethanol by treatment with thionyl chloride or bromide, the alcohol being prepared from ethylene oxide and pyrrolidine, according to known procedure for the condensation of alkylene oxides.

The following example is given to illustrate the practice of the present invention, but is not to be construed as limiting.

N-(beta-pyrrolidinoethyl)-phenothiazine

To a stirred suspension of 4.29 grams (0.11 mole) of sodium amide in 100 milliliters of dry toluene was added 19.9 grams (0.1 mole) of phenothiazine. The solution was heated at reflux for two hours, the sodium salt of phenothiazine precipitating from solution. The toluene suspension of the sodium salt of phenothiazine was cooled to room temperature, whereupon there was added dropwise with continued stirring 13.36 grams (0.1 mole) of beta-pyrrolidinoethyl chloride in 50 milliliters of dry toluene. After addition was complete, the solution was heated under reflux, with stirring, for an additional 15 hours. Upon cooling, the toluene was extracted with dilute hydrochloric acid and the toluene then discarded. The aqueous acid solution was made alkaline with dilute sodium hydroxide, the crude N-(beta-pyrrolidinoethyl)-phenothiazine separating as a brownish oil.

The oil was extracted with ether, the ether solution dried with anhydrous magnesium sulfate, and then filtered. Dry hydrogen chloride was passed into the ether solution and a semi-solid mass, which crystallized after scratching, separated therefrom. The crude N-(beta-pyrrolidinoethyl)-phenothiazine was separated from the ether and, after two crystallizations from isopropanol, 17.0 grams of desired product, melting at 196–197 degrees centigrade (uncorr.), was obtained.

Reference is made to my copending application Serial 774,177, filed concurrently herewith, in which homologues of the compounds of this invention are described and claimed.

Various modifications may be made in the invention without departing from the spirit or scope thereof, and it is to be understood that we limit ourselves only as defined in the appended claims.

We claim:
1. An N - (beta - pyrrolidinoethyl) - phenothiazine derivative of the group consisting of (a) compounds represented by the formula:

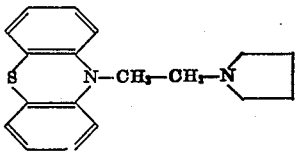

and (b) acid addition salts and (c) quaternary ammonium salts of the said N-(pyrrolidinoethyl)-phenothiazine.
2. N-(beta-pyrrolidinoethyl)-phenothiazine.
3. An acid addition salt of N-(beta-pyrrolidinoethyl)-phenothiazine.
4. N - (beta - pyrrolidinoethyl) - phenothiazine hydrochloride.
5. A quaternary ammonium salt of N-(beta-pyrrolidinoethyl)-phenothiazine.
6. N - (beta - pyrrolidinoethyl) - phenothiazine ethochloride.

7. A process for the production of N-(beta-pyrrolidinoethyl) - phenothiazine which comprises the condensation in the presence of an alkaline condensing agent of phenothiazine and a compound of the group consisting of beta-pyrrolidinoethyl halides and beta-pyrrolidinoethyl halide hydrohalides, and recovery of the N-(beta-pyrrolidinoethyl)-phenothiazine from the resulting product.

JAMES H. HUNTER.
WILLIAM BRADLEY REID, Jr.

REFERENCES CITED

The following references are of record in the file of this patent:

UNITED STATES PATENTS

| Number | Name | Date |
|---|---|---|
| 2,406,594 | Djerassi et al. | Aug. 27, 1946 |

OTHER REFERENCES

Survey of Antimalarial Drugs by Frederick Y. Wiselogle, vol. 2, part I, p. 699 (1946).